United States Patent [19]

Woodruff

[11] Patent Number: 5,078,176

[45] Date of Patent: Jan. 7, 1992

[54] VALVE ASSEMBLY FOR A FILTER DEVICE

[76] Inventor: Keith F. Woodruff, 1485 Force Dr., Mountainside, N.J. 07092

[21] Appl. No.: 548,452

[22] Filed: Jul. 2, 1990

Related U.S. Application Data

[60] Division of Ser. No. 340,345, Apr. 19, 1989, Pat. No. 4,980,073, which is a continuation of Ser. No. 203,196, Jun. 7, 1988, abandoned.

[51] Int. Cl.$^5$ ............................................. F16K 25/00
[52] U.S. Cl. ................................... 137/315; 251/312; 210/424
[58] Field of Search .............. 210/420, 424; 251/312; 137/315, 625.47, 876, 887

[56] References Cited

U.S. PATENT DOCUMENTS

| | | | |
|---|---|---|---|
| 1,491,115 | 4/1924 | Taylor | 137/625.47 |
| 3,536,100 | 10/1970 | Marlow | 137/625.47 |
| 3,853,761 | 12/1974 | McClory | 210/420 |
| 4,172,796 | 10/1979 | Corder | 210/238 |
| 4,359,384 | 11/1982 | Brane | 210/100 |
| 4,425,935 | 1/1984 | Gonzalez | 137/315 |
| 4,504,389 | 3/1989 | Rundzaitis | 210/424 |
| 4,562,994 | 1/1986 | MacDonald | 251/312 |
| 4,686,037 | 8/1987 | Lang | 210/424 |

FOREIGN PATENT DOCUMENTS 180037  6/1963  U.S.S.R. ............ 137/625.47

Primary Examiner—W. Gary Jones
Assistant Examiner—Matthew O. Savage
Attorney, Agent, or Firm—Michael J. Mazza; Anthony M. Santini

[57] ABSTRACT

A valve assembly for use in a filter device is disclosed herein. The valve assembly includes a valve housing, a cylindrical bore in the housing defining at least one open end, a valve stem inserted in the bore and including a groove about the circumference thereof, and a face plate mounted onto the housing about the open end in locking engagement with the housing. The face plate is provided with a cylindrical opening for receiving the valve stem, and a plurality of compressible fingers with gripping tabs about the distal end thereof which engage with the circumferential groove when the stem is inserted into the opening to create a fixed, rotatable relationship with the valve housing. The face plate also includes a locking tab which engages a recess in the housing to lock the face plate to the housing.

2 Claims, 5 Drawing Sheets

VALVE ASSEMBLY FOR A FILTER DEVICE

This is a divisional of Ser. No. 07/340,345 filed on 4-19-89, now U.S. Pat. No. 4,980,073, which was a continuation of Ser. No. 07/203,196 filed 6/7/88, now abandoned.

BACKGROUND OF THE INVENTION

The present invention relates to a device for filtering impure liquids. More particularly, it pertains to a faucet-attachment water filter assembly together with a replaceable filter housing for filtering water flow. The internally by-passable purifier apparatus permits the selective distribution from a common source of either purified or non-purified water.

Various impurities, such as minerals, chlorine, and particulates, often enter domestic tap water to affect the taste, odor, appearance and healthfulness of the water. A significant percentage of water obtained from individual taps in the home and the like contains these chemical constituents in amounts that exceed limits set forth in standards issued by public health services. In some cases, such samples evidence a potential danger. Various studies have identified a need for improved systems to control at least aesthetically undesired concentrations of various minerals and other constituents as well as color, taste and odor. The problem is one of both preventing the transmission of disease or the like as well as overcoming effects that may be adverse to the sensibilities of the user.

In order to remove these impurities, point-of-use filtration devices have become increasingly popular in the home. These have included in-line filters, under-the-sink filters, free-standing drink-size separate filter units, and filter devices that attach to the conventional sink faucet or to the typical aerator secured thereto.

However, the addition of a water purifying apparatus has frequently meant the undesired occupation of counterspace, under-sink space or interference to convenient utilization because of the need for flexible hoses. In fact, to achieve comparatively low cost in such apparatus, manufacturers have been led to the production of units which attain that objective only at the expense of interference with space utilization or aesthetic unattractiveness.

Faucet-attachment types of water filters have become a viable commercial product, possibly by reason of the fact that they do not require changes in plumbing to allow their use in the home or similar environment. See, for example, U.S. Pat. No. 3,853,761 to McClory, U.S. Pat. No. 4,172,796 to Corder, U.S. Pat. No. 4,359,384 to Brane, U.S. Pat. No. 4,504,389 Rundzaitis, and U.S. Pat. No. 4,686,037 to Lang. Typically, they attach to the outlet of a faucet in the kitchen sink and include valving to permit flow of either tap or filtered water, the water to be filtered flowing through a replaceable cartridge mounted upon one portion of the appliance. The usual cartridge includes activated charcoal granules, impregnated carbon paper, or impregnated carbon cotton effective in removing tastes and odors from the water.

However, this type of prior art device has had the disadvantages that the operation of the valve unit is not always reliable and tap water leaks from the valve unit while purified water is being obtained, and that the valve unit becomes unserviceable in a relatively short period of time due to wear of the valve element disposed therein. In addition, the valve unit has been complicated in construction and hence difficult to manufacture, and the mounting of the valve unit on the faucet has also been difficult.

Equally important, many of the devices in the prior art have cartridge filters that do not filter the water adequately and, moreover, require the entire water filter apparatus to be disconnected from the water faucet in order to replace the cartridge filter in the apparatus. Furthermore, the upward extension of the filter cartridge in a vertical plane above the is considered, by many consumers, to be aesthetically unattractive.

In summary, prior art apparatus and filter mechanisms have not been as efficient as they might be, and they also have not led to efficiencies in manufacture. Furthermore, they have sometimes been aesthetically unattractive for household use.

SUMMARY OF THE INVENTION

It is therefore an object of the present invention to provide a new and improved water purifying apparatus which overcomes at least many of the aforenoted disadvantages and otherwise undesirable features.

It is another object of the present invention to provide a new and improved water filter housing that is readily replaceable as a unitary structure, economical, discardable as a unitary structure when expended, and which through its own mechanical structure both simplifies and augments the operation of its associated water purifying apparatus.

It is a further object of the present invention to provide an improved water filter that utilizes a replaceable, unitary filter housing and is inexpensive to manufacture, requiring less labor-intensive techniques, less material, and less costly tooling techniques.

It is a still further object of the present invention to provide a new and improved water purifier which is aesthetically pleasing when installed in the home or even in a commercial or manufacturing environment.

Related to all of the foregoing objects, it is an aim to provide a new and improved water purifier that is significantly effective while being economical of production, as well as an easily replaceable water filter housing wherein the housing is completely detached from a stationary valve housing and discarded during replacement.

In accordance with one embodiment of the present invention, there is provided a device for filtering impure liquids as a two-piece molded construction utilizing the minimum amount of materials and parts necessary to manufacture an effective, reliable apparatus. In its preferred embodiment, the device is molded of high grade polystyrene, or other thermoplastic or thermoset resin. A valve assembly housing is coupled in stationary fashion to a standard water faucet or the like. A filter housing is detachably secured to the valve assembly for purifying the water supply from the water faucet. The valve assembly housing has a raw water inlet in axial alignment with a raw water outlet. A cylindrical bore through the valve assembly housing defines a liquid flow passage outward to the filter. A valve stem is slidably received within the cylindrical bore to selectively divert fluid flow through the lateral flow passage. The valve stem has an radial conduit between and in alignment with the raw water inlet and raw water outlet to permit the flow of unfiltered water directly through the raw water outlet of the apparatus.

Exclusive from the radial conduit, the valve stem is partially tapered so as to direct the inflow of water from the raw water inlet through the cylindrical bore to exit the fluid outlet port. The fluid outlet port communicates in liquid-tight relationship with the fluid inlet port of the filter housing when the filter housing is secured on the valve assembly housing.

Water entering the filter housing through the fluid inlet port circulates around the conduits formed between the filter material permanently fixed within the filter housing and ultimately passes through the filter material and becomes purified thereby. The water then exits from the purified water outlet projecting from the lower cover of the filter housing. The fluid inlet port and fluid outlet port are defined in correspondingly opposed positions of the sidewall of the filter housing and valve assembly housing, respectively.

A diagonal groove is provided circumferentially around the valve stem in an S-type configuration between the tapered edge and radial conduit thereof. A resilient sealing member, in a corresponding S-ring configuration, is disposed in and throughout the groove so as to block fluid flow to the tapered edge while permitting flow between the raw water inlet and raw water outlet when the radial conduit is aligned therebetween. The diagonal groove configuration allows for easier placement of the S-ring on the valve stem during manufacturing, as well as other functional advantages, as will be further described herein.

An alternative embodiment of a valve assembly housing comprises a face plate which, during manufacture, is press fitted into place into an open end of the valve housing assembly. The face plate comprises a plurality of compressible fingers, one of which has a locator pin integrally formed thereon. When the face plate is press fitted, in a snug fashion, into the open end of the valve assembly, the compressible finger having the locator pin compresses inwardly until the pin snaps into locking engagement with a pinhole formed in the valve housing. Thereafter, the valve stem is inserted through a central opening of the face plate and into the cylindrical bore of the valve housing. As the valve stem passes through the face plate, the compressible fingers compress away therefrom, allowing the stem's insertion. When the stem is fully inserted, the tabs of the compressible fingers lock into a circumferential groove, in fixed rotating relationship, formed at one end of the valve stem. As in the preferred embodiment, the valve stem has an O-ring, radial conduit and S-ring thereon. The alternative valve stem assembly provides ease of manufacture and assembly and, hence, reduced costs. Once assembled, the valve stem can be easily, selectively operated from a filtered position to a non-filtered position without concern as to displacement of the valve stem and/or increased likelihood of unserviceability due to complicated parts or mode of operation. The alternative embodiment improves performance by reducing mechanical problems in component assembly, thereby providing further improved consumer performance.

The coupling means for removably connecting the filter housing to the valve assembly housing forms a double-dovetail connection in two perpendicular planes wherein the coupling element on the valve assembly housing flares outwardly toward the bottom thereof and has tapered edges, creating a liquid-tight seal when joined to a correspondingly shaped coupling receiving element formed on the filter housing. Thus, a simple snap-on/snap-off, liquid-tight connection is formed between the filter housing and valve assembly housing for quick and easy replacement of the spent filter.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements.

DETAILED DESCRIPTION OF THE INVENTION

Figure 1:
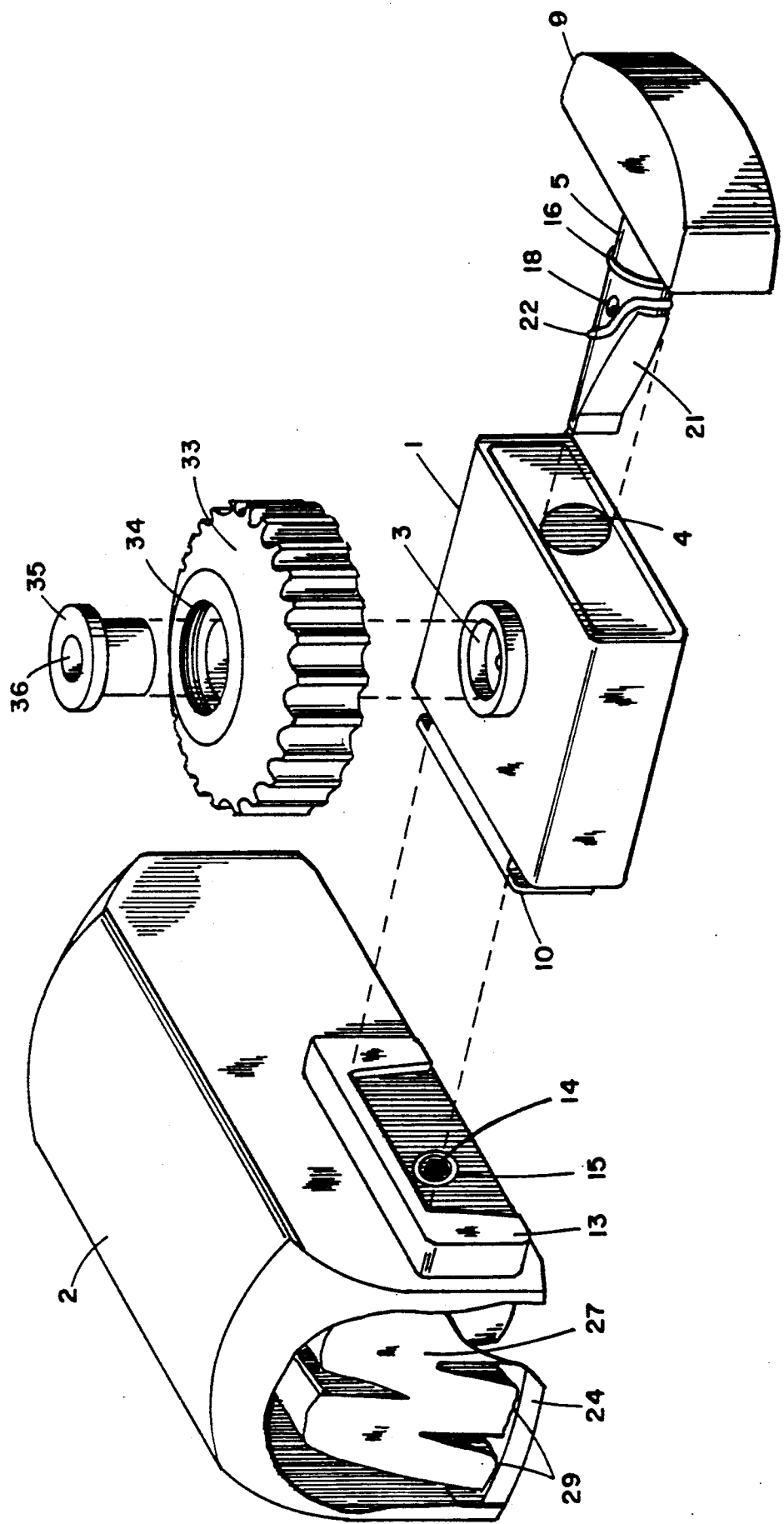
FIG. 1 is an exploded perspective view of the filtration device embodying the present invention.
Figure 2:
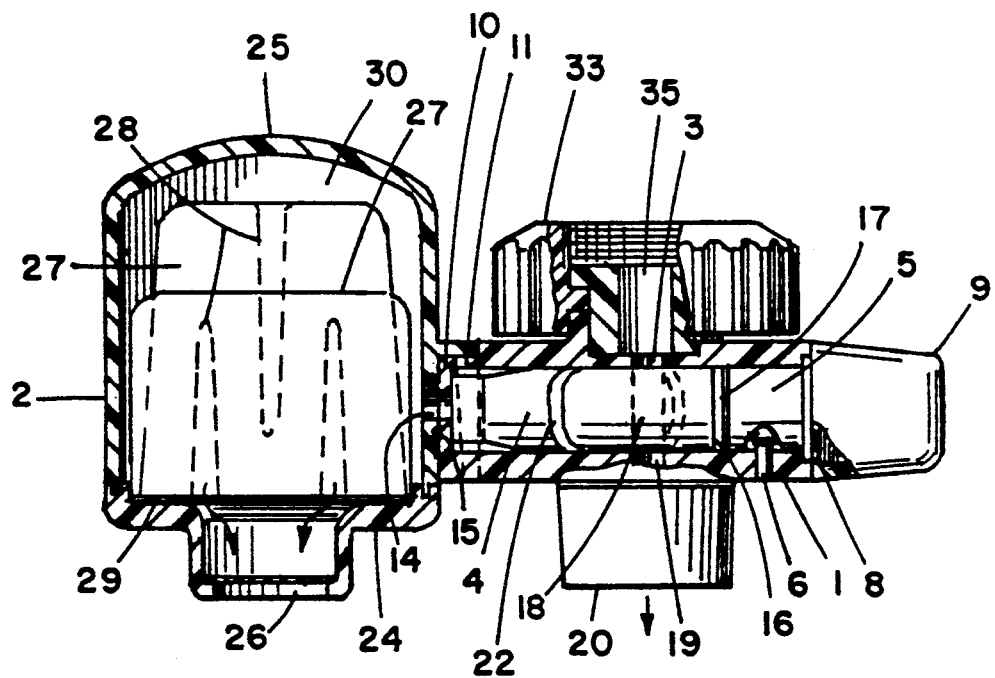
FIG. 2 is a cross-sectional view of the device of the present invention with the valve at the non-filtered position.

As specifically embodied herein and depicted in FIGS. 1 and 2, a two-piece molded construction is provided having valve assembly housing 1 and filter housing 2. Included within valve assembly housing 1 is raw water inlet 3 which communicates with cylindrical bore 4 defining a liquid flow passage outwardly to filter housing 2. Valve stem 5 is rotatably disposed within cylindrical bore 4 and held in place by retaining pin 6 which extends up from the bottom of valve assembly housing 1.

Figure 3:
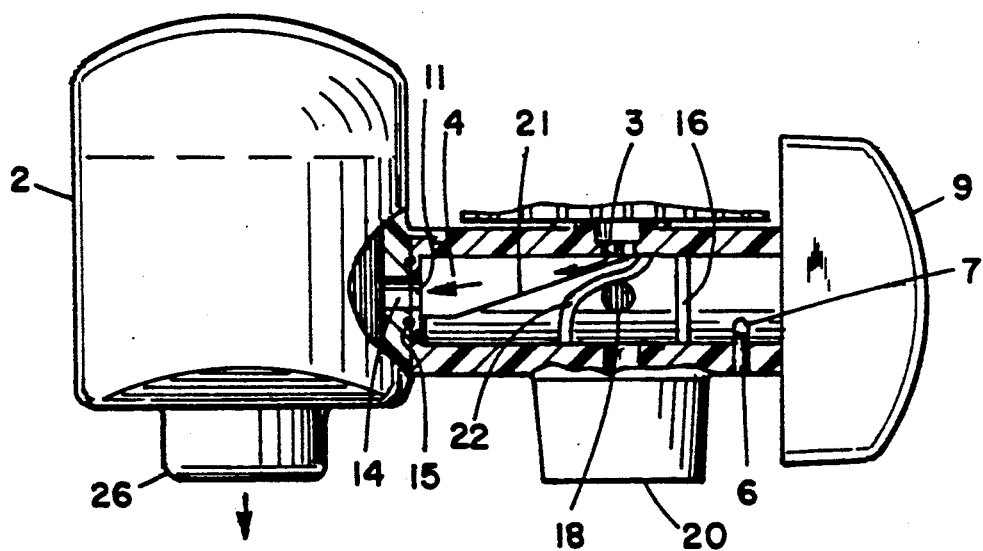
FIG. 3 is a fragmentary cross-sectional view of the device of the present invention with the valve at the filtered position.

As more clearly shown in in FIG. 3, pin groove 7 is formed around a partial circumference of valve stem 5 to engage with pin 6. Valve stem 5 has plate 8 integrally formed thereon and at one end thereof abutting against a corresponding end of valve housing 1. Knob 9 is in fixed attachment with plate 8 and provides a manual control to selectively operate valve stem 5 semi-rotatably between a first (filtered) and second (non-filtered) position.

Distal from said end where plate 8 abuts with valve housing 1, there is formed on the valve housing a valve coupling element 10. Fluid outlet port 11 is provided with in valve coupling 10 and communicates with cylindrical bore 4. Washer seal receiving groove 12 is formed circumferentially around outlet port 11.

Filter coupling 13 is integrally formed on the sidewall of filter housing 2 for intimate engagement with valve coupling 10. Fluid inlet port 14 is centrally disposed within filter coupling element 13. Washer seal 15 is circumferentially positioned around fluid inlet port 14, and when the coupling elements are joined, seats in correspondingly shaped washer seal receiving groove 12 of valve coupling 10. Thus, direct alignment between fluid inlet port 14 and fluid outlet port 11 is formed, thereby creating a liquid flow passage from valve assembly housing 1 into filter housing 2 when valve stem 5 is in the filter mode.

Additionally, a watertight connection is formed between the fluid ports when the coupling elements are joined, as the washer seal 15 is compressed into the receiving groove 12. Further details with respect to the operation of attachment will be provided later on herein.

Circumferential groove 17 is formed in valve stem 5 to receive O-ring 16. O-ring 16 forms a washer-type seal to prevent water from flowing out to knob 9, as well as sealing valve stem 5 within cylindrical bore 4.

Radial conduit 18 is cut into valve stem 5 and capable of being aligned with raw water inlet 3 when valve stem 5 is in the non-filtered position (see FIG. 2). Thus, radial conduit 18 serves to direct a water faucet supply entering raw water inlet 3 directly through raw water outlet 19 when non-purified water is desired. Valve aerator 20 is a commercial item attached to the lower cover of valve assembly housing 1 in direct alignment with raw water outlet 19 and functions to coalesce the water flow.

Valve stem 5 is further provided with tapered edge 21 which, when aligned with raw water inlet 3, deflects fluid flow through cylindrical bore 4 outward to fluid outlet port 11. Once therethrough, the fluid passes into fluid inlet port 14 of filter housing 2 to be purified. The above is accomplished by rotating valve stem 5 to a position 90° different from that shown in FIG. 2 (i.e. see FIG. 3). FIG. 3 discloses the apparatus in the filter mode.

To complete a seal between tapered edge 21 and radial conduit 18, a circumferential S-shaped groove is diagonally cut into stem 5 so as to completely, circumferentially separate tapered edge 21 from radial conduit 18. A resilient S-ring 22 is then seated within the circumferential S-groove.

Accordingly, S-ring 22 serves to block fluid flow to tapered edge 21 while permitting fluid flow between raw water inlet 3 and raw water outlet 19 when radial conduit 18 is aligned therebetween in the non-filtered position. Correspondingly, when valve stem 5 is in the filtered position, S-ring 22 serves to prevent the possibility of fluid flow anywhere except down tapered edge 21 and out to filter housing 2. In this manner, raw water cannot accidentally leak around valve stem 5 and out raw water outlet 19. Thus, if one desired to, for instance, fill a jug with purified water, the raw water would not be able to leak out and mix with the filtered water. Furthermore, the proximity between S-ring 22 and 0-ring 16 provides for a maximum seal against back pressure when the valve stem is in the filtered position.

Figure 4:
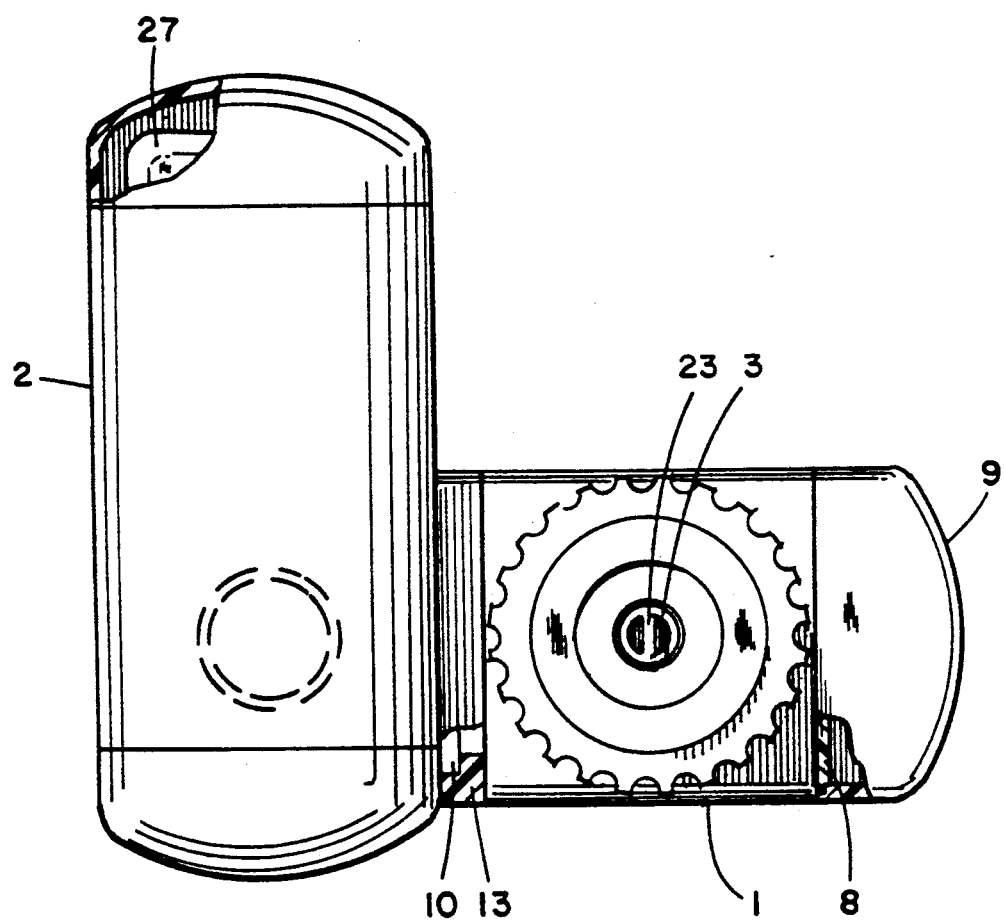
FIG. 4 is a top plan view of that shown in FIG. 2.

It will also be observed that S-ring 22 must travel by the point of intersection between the walls of raw water inlet 3 and the longitudinal bore when valve stem 5 is turned from one position to another. As this point of intersection can create a sharp edge and damage S-ring 22, raw water inlet 3 is provided with rib 23 (see FIG. 4) extending thereacross. Rib 23 prevents S-ring 22 from pushing itself against the corners of the aperture of raw water inlet 3 as S-ring 22 passes thereacross during rotation in valve stem position. In other words, rib 23 creates a downward pressure onto S-ring 22 so that S-ring 22 avoids contacting any sharp edge created by the intersection of the walls of raw water inlet 3 and lateral bore 4, thereby preventing damage to S-ring 22.

Returning to the filter housing unit, filter housing 2 is formed by ultrasonically welding lower cover 24 to upper cover 25 to form a single molded unit. Filter aerator 26 is integrally formed as part of lower cover 24. Permanently sealed within filter housing 1 is filter material 27.

In accordance with the present invention, filter material 27 may comprise activated carbon particles integrally mixed with a bonding agent, and the bonding agent and such carbon particles are formed into a self-supporting stable filter structure. The bonding agent may comprise any thermoplastic or thermosetting polymeric material, preferably synthetic, which is capable of being shaped under the conditions of processing to be utilized. Preferably, the bonding agent is a "thermoplastic material", by which is meant generally any polymeric material having thermoplastic properties and may include any synthetic or semi-synthetic condensation or polymerization product.

Consistent herewith, the activated carbon particles are intimately mixed with the bonding agent particles and the particles providing the bonding agent are so selected that they have a size no less than, and preferably substantially greater than, on average, the particle size of the activated carbon particles. After the activated carbon particles and bonding agent particles are integrally mixed until substantial uniformity of distribution is attained, the mixture is formed into a suitable structure with heat being applied to soften the bonding agent whereby it adheres to the adjacent carbon particles and serves as a binder therebetween, thereby resulting in a porous plastic matrix structure having entrapped therewithin the activated carbon particles which will perform the function of filtration of the liquid, especially water.

It may also be desirable to incorporate a filler and/or other appropriate material(s) into the filter in order to, e.g., assist the activated carbon in its filtration activity, or to impart a desired property to the liquid.

Filter material 27 may occupy almost the entire volume within filter housing 2, following the contours thereof. Alternatively, filter material 27 may, for instance, be smaller than the space provided within filter housing 2 (see FIG. 2). Of course, the larger the filter surface area, the greater the filtering effect. To this end, filter material 27 may be provided with inner and outer cavities 28 to increase the aforementioned surface area.

Additionally, as previously alluded to, filter material 27 is permanently affixed to the interior of lower cover 24 by adhesive 29 spread thereunder. Thus, fluid entering filter housing 2 is forced to run up and around the conduit 30 surrounding the top and sides of porous filter material 27 and then pass therethrough before exiting through filter aerator 26. The combination of adhesive, filter housing size and filter material design insures that incoming water received through fluid inlet port 14 is uniformly distributed throughout the filter material.

Accordingly, a simple and highly effective filter apparatus having economy of manufacture and long-term durability is provided. Further adding to the convenience and novelty of this device is the unique coupling elements which allow for quick snap-on/snap-off filter housing replacement.

Turning thereto, with reference to FIGS. 5 and 6, there is disclosed a unique coupling element for a water filtration device which provides a definite water tight seal between valve assembly housing 1 and filter housing 2, yet does not require the disassembly of numerous component parts to replace the filter material, as required in prior art devices. Specifically, as shown more clearly in FIG. 5A, filter coupling element 13 is downwardly tapered in its side view (i.e. edge thickness) and is provided with an oppositely tapered valve coupling receiving area 31. As shown in FIG. 5B, valve coupling element 10 is upwardly tapered and provided with filter coupling receiving area 32, which is oppositely tapered thereto.

As is evident, valve coupling receiving area 31 is correspondingly shaped to valve coupling 10 and, similarly, filter coupling receiving area 32 is correspondingly shaped to filter coupling 13. Accordingly, filter coupling element 13 is capable of being intimately mated onto valve coupling element 10 such that the correspondingly tapered couplings will fit snugly into each other and filter housing 2 will be felt to snap onto valve housing 1 as washer seal 15 seats itself into washer seal receiving groove 12, thereby creating a direct alignment and watertight fit between fluid outlet port 11 and fluid inlet port 14 (see FIG. 5C).

Figure 5A:
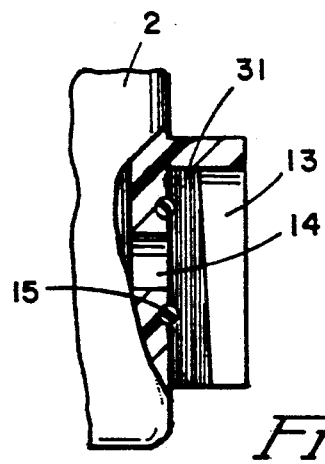
FIG. 5A is a fragmentary cross-sectional view of the coupling element formed on the filter housing.
Figure 5C:
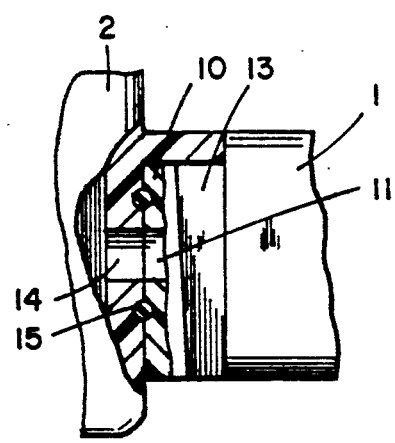
FIG. 5C is a fragmentary cross-sectional view of the coupling elements joined to each other.
Figure 5B:
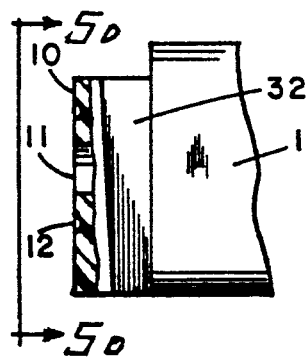
FIG. 5B is a fragmentary cross-sectional 5 view of the coupling element formed on the valve assembly housing.
Figure 5D:
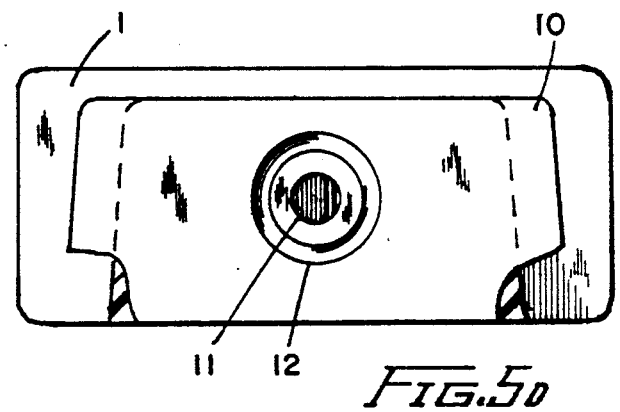
FIG. 5D is an elevational view taken along 10 lines 5D—5D in FIG. 5B.
Figure 6A:
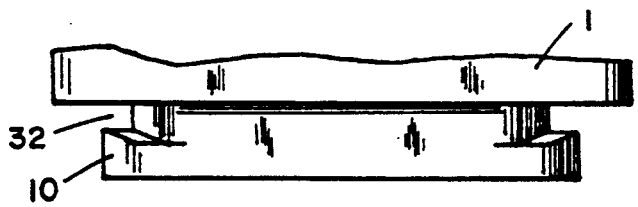
FIG. 6A is a top view of the coupling element formed on the valve assembly housing.
Figure 6B:
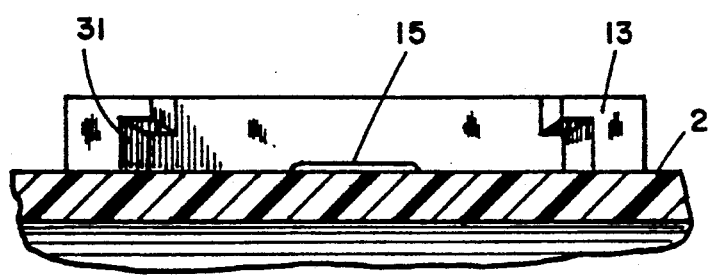
FIG. 6B is a bottom view of the coupling element formed on the filter housing.
Figure 7:
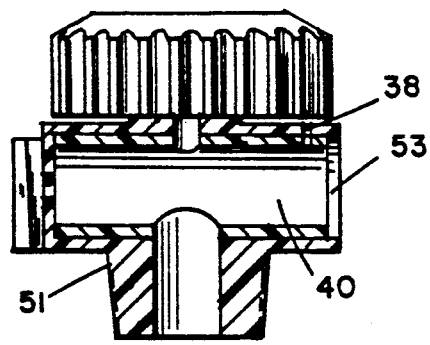
FIG. 7 is a cross-sectional view of a valve assembly housing of an alternative embodiment.
Figure 8:
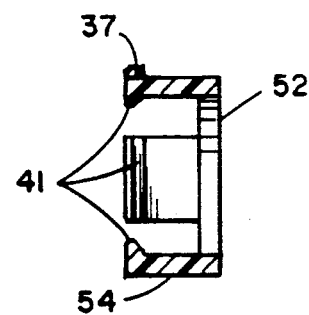
FIG. 8 is a side view of a face plate used in combination with the valve housing of FIG. 7.
Figure 9:
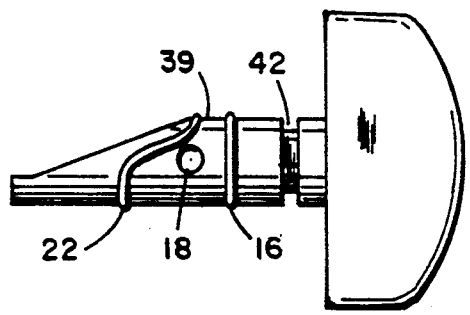
FIG. 9 is a side view of a valve stem used in combination with the components of FIGS. 7 and 8.

Referring to FIG. 5D, it is seen that the coupling elements are not only upwardly or downwardly tapered (as shown in FIGS. 5A and 5B), but the coupling element is also outwardly flared so as to provide an even more definite fit and seal. FIGS. 6A and 6B more clearly show the coupling structure design and relationship.

Specifically, FIG. 6A shows the upward taper and outward flare of valve coupling element 10. FIG. 6B correspondingly indicates (from a bottom view) the downward taper and outward flare of filter coupling 13. This edge taper/face flare design in two perpendicular planes has been labeled a "double-dovetail".

The unique double-dovetail structure of the present invention provides for tremendous ease in the removal of the disposable filter housing, as well as a water-tight seal against leakage. It should be particularly noted that, in the present invention, the entire filter housing (which contains a permanently fixed filter material) is discarded. To the contrary, the prior ar teaches filter housing containing a filter cartridge which, in turn, contains a filter material. The filter cartridge is intermittently replaced within a reclosable filter housing, permanently attached to a valve assembly.

None of the foregoing, numerous operations are required with the apparatus of the present invention. A user merely snaps off the filter housing, disposes it and snaps on a new filter housing. It can be readily discerned that, not only does the present invention provide easy removability of the filter, but also simpler parts and, therefore, fewer molding requirements.

Moreover, the convenience and ease provided by the present invention is further increased by the method of attachment of the apparatus to a water faucet supply. Specifically, faucet coupling 33, having interiorly threaded collar 34, is provided on the upper cover of valve housing 1 and centrally disposed around raw water inlet 3. Collar nut 35 holds faucet coupling 33 in centrally fixed attachment to raw water inlet 3, while permitting rotatable movement of faucet coupling 33 for removable attachment to a water faucet. Collar nut 35 has central bore 36 in direct alignment with raw water inlet 3 such that a water supply from a faucet can easily enter the water inlet. Thus, the ease of attachment of the device of the present invention is quite evident.

In particular, a user would merely remove a water faucet aerator and attach the valve assembly housing of the present invention onto the water faucet by simply screwing the faucet coupling thereonto. Thereafter, a filter housing is quickly snapped onto the valve housing for efficient and superior fluid filtration.

The preferred embodiment described herein provides, among other things, an inexpensive, easily manufactured, durable water filter for near effortless use in the home environment. The two-piece molded construction utilizes a minimum amount of materials and parts to manufacture an effective, reliable filter unit.

Figure 10:
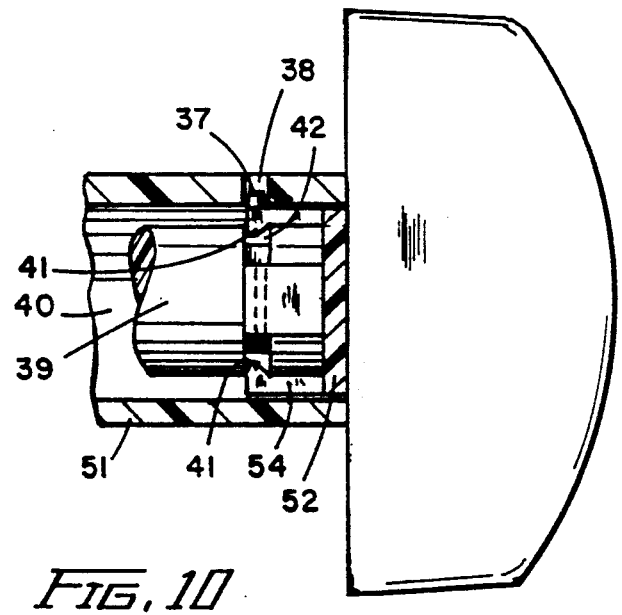
FIG. 10 is a fragmentary cross-sectional view of the alternative valve stem and housing assembly in cooperating relationship.

FIGS. 7-10 depict an alternative embodiment of a valve assembly housing useful with the present invention. Valve assembly housing 51 comprises face plate 52 which, during manufacture, is press fitted into place onto open end 53 of valve housing assembly 51. Face plate 34 comprises a plurality of compressible fingers 54, one of which has locator pin 37 integrally formed thereon. When face plate 52 is press fitted, in a snug fashion, into open end 53 of valve assembly 51, the compressible finger having the locator pin 37 compresses inwardly until pin 37 snaps into locking engagement with pinhole 38 formed in valve housing 51. Thereafter, valve stem 39 is inserted through a central opening of face plate 52 and into cylindrical bore 40 of valve housing 51. As valve stem 39 passes through face plate 52, compressible fingers 54 compress away therefrom, allowing the stem's insertion. When stem 39 is fully inserted, tabs 41 of compressible fingers 54 lock into circumferential groove 42, in fixed rotating relationship, formed at one end of valve stem 39. As in the preferred embodiment, valve stem 39 has O-ring 16, radial bore 18, and S-ring 22 thereon. FIG. 10 represents the components of the alternative valve stem assembly in completed, locking engagement.

As is evident therefrom, the alternative valve stem assembly provides ease of manufacture and assembly and, hence, reduced costs. Once assembled, the valve stem can be easily, selectively operated from a filtered position to a non-filtered position without concern as to displacement of the valve stem and/or increased likelihood of unserviceability due to complicated parts or mode of operation. The alternative equipment improves performance by reducing mechanical problems in component assembly, thereby providing further improved consumer performance.

While in the foregoing there is set forth a detailed description of only one particular preferred embodiment and alternative embodiment of the present invention, they must be considered simply as illustrative. In this regard, the scope of the invention is indicated by the following claims in view of the preceding description, and the claims are intended to embrace all changes that come within their meaning and range of equivalency.

What is claimed is:

1. A valve assembly comprising:
   a valve housing;

a cylindrical bore in said housing defining at least one open end;

a valve stem adapted for insertion into said open end and through said bore, the valve stem including a groove about a circumference thereof; and a face plate for mounting onto the housing about said open end in locking engagement with the housing, the face plate including a cylindrical opening for receiving the valve stem in a fixed rotatable relation with the face plate, the face plate further including a locking means to lock the face plate to the valve housing, and a fastening means comprising a plurality of compressible fingers with gripping tabs about a distal end thereof which engage with said circumferential groove when said valve stem is inserted into said opening to create a fixed, rotatable relationship with the valve housing.

2. The valve housing of claim 1 wherein the locking means comprises a locking tab which engages with a recess in the housing to form said locking engagement.

* * * * *